Figure 1:
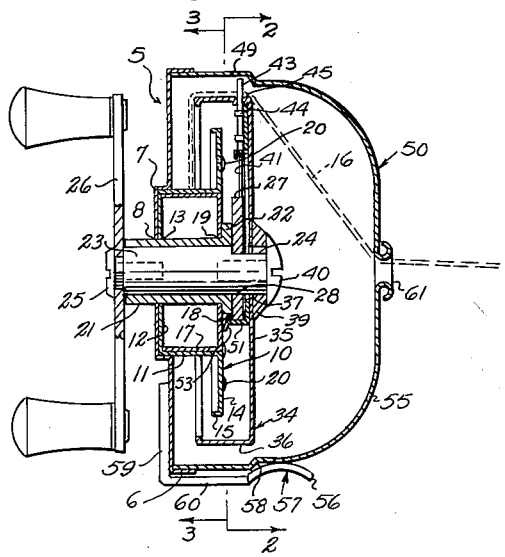

March 10, 1953  LE MOYNE J. UERLING  2,630,979

FISHING REEL

Filed Aug. 5, 1949

INVENTOR.
LEMOYNE J. UERLING,
BY
McMorrow, Berman & Davidson
ATTORNEYS.

Patented Mar. 10, 1953

2,630,979

UNITED STATES PATENT OFFICE 2,630,979

FISHING REEL

Le Moyne J. Uerling, Ogallala, Nebr.

Application August 5, 1949, Serial No. 108,747

2 Claims. (Cl. 242—84.1)

This invention relates to an improved "peel-off" fishing reel, the primary object of the invention being to provide a reel of this type having simplified and improved construction and relative arrangement of the components.

Another important object of the invention is the provision of a reel of the character indicated above whose operation is more efficient and reliable.

Another important object of the invention is the provision of a reel of the above-indicated character which can be manufactured in a serviceable, rugged and attractive form at relatively low cost.

Other important objects and advantageous features of the invention will be apparent from the following description and appended drawings, wherein, merely for present purposes of illustration, a specific embodiment of the invention is set forth in detail.

Figure 2:
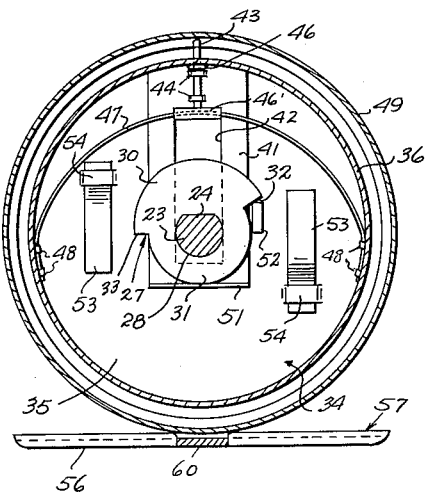
Figure 3:
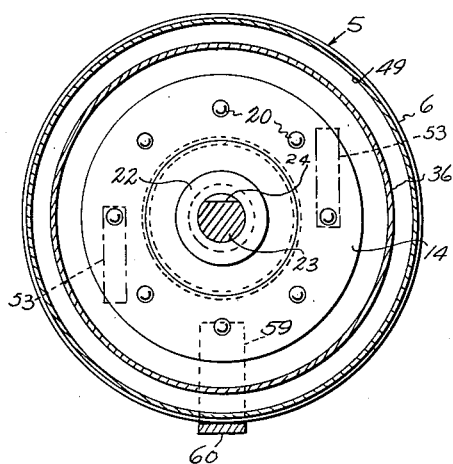
Figure 4:
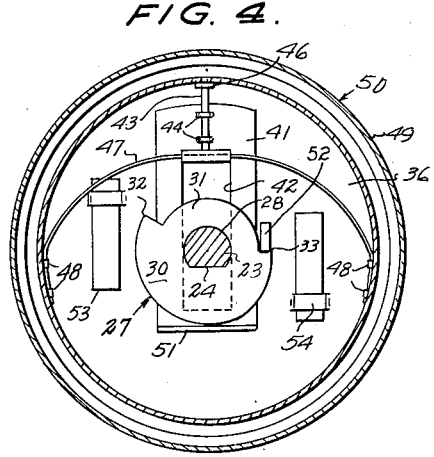

In the drawings:

Figure 1 is a substantially central vertical longitudinal section;

Figures 2 and 3 are transverse vertical sections, taken on the lines 2—2 and 3—3, respectively, of Figure 1;

Figure 4 is a view similar to Figure 2, but showing the cam and slide in pick-up, pin-retracting position.

Referring in detail to the drawings, the numeral 5 generally designates the circular pan-shaped base of the illustrated reel, involving a peripheral flange 6 and a central circular recess 7, formed with a central circular hole 8.

The reel spool, generally designated at 10, which is stationary on the base 5, comprises a cylinder 11 fitting in and adapted to be welded or otherwise secured in place in the recess 7, whereby the spool 10 is mounted on the base 5. The outer end of the cylinder 11 has a flange 12 formed with a central opening 13 of substantially the same size as, and aligned with, the hole 8 in the base 5. On the inner end of the cylinder 11 is an external annular flange 14 formed with a rim 15, the flange 14 acting to confine the fishing line 16 on the spool cylinder 11. A support cylinder 17 fitting within the spool cylinder 11 has its open outer end engaged with the flange 12 of the cylinder 11 and has its inner end flush with the inner end of the cylinder 11 and provided with an internal flange 18 formed with a central opening 19 aligned with the openings 8 and 13. The spool flange 14 is formed with a concentric circle of circumferentially-spaced, rounded protrusions 20 formed to project on the inner side of the flange 14.

Press fitted through the openings 8, 13 and 19 is a tubular bushing 21 having an external annular flange 22 on its inward end engaged with the inner side of the flange 18 of the support cylinder 17, the outer end of the bushing being extended outwardly from the base 5. The bushing 21 acts as the journal bearing for the reel shaft 23, whose outer end is flush with the outer end of the bushing 21, with its inner end extending inwardly beyond the inner end of the bushing 21 and having a flattened side portion 24. A headed screw 25 traverses the middle of a double-ended reel crank 26 and is threaded into the outer end of the shaft 23 to secure the crank removably on the shaft 23.

Removably mounted on the shaft 23 against the bushing flange 22 is the rotary plate cam 27 formed with an opening 28 having a flat side conformably and non-rotatably receiving the similarly-shaped inner end of the reel shaft 23. The cam 27 has a substantially semi-circular high portion 30 and a substantially semi-circular low portion 31 which, with the high portion 30, defines stop shoulders 32 and 33, respectively.

Mounted inwardly of the cam 27 on the inner end of the reel shaft is the reel rotor 34 comprising a circular web or disk 35 substantially larger in diameter than the spool flange 14 and having an outwardly-projecting rim flange 36 concentrically spaced from the spool flange and projecting outwardly to a point midway between the spool flange 14 and the portion of the base 5 acting as the outer spool flange. The web 35 has a round central opening 37 rotatably receiving the inner end of the reel shaft. A washer 39 is circumposed on the inner end of the shaft 23 and held removably in place by a headed screw 40 threaded in the inner end of the shaft 23, with the washer 39 engaging the inner side of the web 35 of the rotor 34.

Between the cam 27 and the rotor web 35 is positioned the cam-operated plate slide 41 which is of transversely-elongated, rectangular shape and is formed with a longitudinal slot 42 slidably passing the shaft 23. Projecting beyond one end of the slide 41 is the line pick-up pin 43 held in place by punched-out portions 44, 44 of the slide. The pin 43 works radially through a hole 45 in a thickened area 46 of the rim flange 36 of the rotor 34 close to the web 35. At the radially-outward end of the slot 42 is a turned-over portion 46' acting to hold the middle of a bowed leaf spring 47 having its ends secured to diametrically-opposed points on the inner side of the rim flange by punched-out lugs 48. The spring 47 normally holds the slide 41 in an outward position in which the pickup pin 43 extends radially outwardly from the rotor rim flange 36 and across the space between the rotor rim flange 36 and the annular portion 49 of the removable cover or case 50.

The radially-inward end of the slide 41 has an outwardly-projecting flange 51, acting as a cam follower, arranged to be engaged by either the high cam portion 30 or the low cam portion 31, depending upon the position of the cam 27. A stop lug 52 projects outwardly from the rotor web 35 for engagement by the cam stop shoulders 32.

Mounted on the rotor web 35 at opposite sides of the cam 27 are leaf springs 53, 53 secured in chordal positions by punched-out web portions 54, 54, with the free ends of the springs 53, 53 extending in opposite directions and deflected outwardly to engage with diametrically-opposite ones of the protuberances 20 on the spool flange 14.

The removable case 50 comprises the dome-shaped portion 55 spaced axially from the inner end of the shaft 23 and having thereon the larger-diameter, annular portion 49 which fits snugly within the base flange 6. The case 50 is retained removably in place by the curved portion 56 of the reel seat 57 engaging the shoulder 58 on the case. The reel seat 57 includes the portion 59 secured to the outer side of the base 5 and the right-angular portion 60 reaching along the side of the case 50 and terminating in the curved cross-section portion 56. A beaded hole 61 at the center of the dome portion 55 provides entrance for the fishing line 16.

In operation, the parts are normally in the positions shown in Figure 2, wherein the pick-up pin 43 is extended beyond the rotor rim flange 36 and the low portion 31 of the cam 27 is engaged with the slide cam follower 51, with the cam shoulder 32 engaged with the stop lug 52. In this disposition of the components, rotation of the reel crank 26 in the forward direction produces rotation of the rotor 34 with the pin 43 acting to wind the fishing line 16 onto the spool cylinder 11.

To free the line 16 to pay out freely, as in casting, the reel crank 26 is turned about a half-turn in the reverse direction, so that the high portion 30, instead of the low portion 31, engages the slide cam follower 51 and moves the slide 41 inwardly to the position shown in Figure 4, wherein the shoulder 33 engages the lug 52, and wherein the pick-up pin 43 is retracted out of the space between the rotor rim flange 36 and the annular portion 49 of the case 50, thereby enabling the line 16 to peel off the spool 10.

The engagement of the leaf springs 53 with the protuberances 20 on the spool flange 14 acts to retard rotation of the rotor 34 relative to the spool 14 and case 50 in either direction, until the cam 27 has reached either of the final positions shown in Figures 2 and 4. As the springs 53 engage and pass over the protuberances 20, a clicking noise is produced which is indicative of the progress of the operation of setting the reel.

I claim:

1. In a reel, a base, a spool fixed on and projecting inwardly from said base, a shaft extending axially through said spool and journaled on said base, said shaft having one end extending axially outwardly beyond said base and another end projecting axially inwardly beyond said spool, a disc rotor journaled on said other end of the shaft, a pick-up pin mounted on said rotor for radial movement relative thereto between a retracted position and a projected line-winding position in which the pin projects beyond the periphery of the rotor, a slide plate mounted on said other end of the shaft for rotary and radial movement relative to the axis of the shaft, said slide plate being operatively connected to said pick-up pin and having a cam follower portion, a stop lug on said rotor at one side of said shaft, spring means normally urging said slide plate and pin radially outwardly, a cam plate fixed on said other end of the shaft and having arcuate high and low peripheral portions defining shoulders at opposite ends thereof, and means for rotating said shaft in one direction to engage the high peripheral cam portion with the cam follower portion of the slide plate and retract said slide plate and pick-up pin from line-winding position to permit a line to peel off the spool, and for rotating said shaft in the opposite direction to engage the low peripheral cam portion with said cam follower portion so as to permit said spring means to restore the slide plate and pick-up pin to radially outward line-winding position with a shoulder of said cam plate engaged with said stop lug in a manner to connect said cam plate and slide plate for rotation together in said opposite direction.

2. In a reel, a base, a spool fixed on and projecting inwardly from said base, a shaft extending axially through said spool and journaled on said base, said shaft having one end extending axially outwardly beyond said base and another end projecting axially inwardly beyond said spool, a disc rotor journaled on said other end of the shaft, a pick-up pin mounted on said rotor for radial movement relative thereto between a retracted position and a projected line-winding position in which the pin projects beyond the periphery of the rotor, a slide plate mounted on said other end of the shaft for rotary and radial movement relative to the axis of the shaft, said slide plate being operatively connected to said pick-up pin and having a cam follower portion, a stop lug on said rotor at one side of shaft, spring means normally urging said slide plate and pin radially outwardly, a cam plate fixed on said other end of the shaft and having arcuate high and low peripheral portions defining shoulders at opposite ends thereof, and means for rotating said shaft in one direction to engage the high peripheral cam portion with the cam follower portion of the slide plate and retract said slide plate and pick-up pin from line-winding position to permit a line to peel off the spool, and for rotating said shaft in the opposite direction to engage the low peripheral cam portion with said cam follower portion so as to permit said spring means to restore the slide plate and pick-up pin to radially line-winding position with a shoulder of said cam plate engaged with said stop lug in a manner to connect said cam plate and slide plate, said spool having a lateral flange on its axially inward end, said flange being formed with projection means on its axially inward side, and friction spring means on said rotor frictionally engaging said projection means.

LE MOYNE J. UERLING.

REFERENCES CITED

The following references are of record in the file of this patent:

UNITED STATES PATENTS

| Number | Name | Date |
| --- | --- | --- |
| 2,492,587 | Ledingham | Dec. 27, 1949 |
| 2,521,543 | Shakespeare et al. | Sept. 5, 1950 |